Patented Aug. 10, 1926.

1,595,756

UNITED STATES PATENT OFFICE.

BERT C. CHAMBERS, OF DOBBS FERRY, AND JOHN P. KNIERIM, OF BROOKLYN, NEW YORK, AND GEORGE S. MESSING, OF EAST ORANGE, NEW JERSEY, ASSIGNORS TO JEAN BERTÉ INC., OF NEW YORK, N. Y., A CORPORATION OF NEW YORK.

MULTICOLOR PRINTING.

No Drawing.  Application filed December 30, 1925. Serial No. 78,376.

Our invention relates to processes for printing in colors and more particularly to a process for producing colored prints which have the appearance, the brilliancy and transparency of color of a water color painting. It is an object of our invention to provide a process of this nature which is adapted for use upon the printing presses now in use.

The development of color printing has from the beginning been dependent on the development of plate making. The plates have generally been made of hard, unyielding materials, such as metal, and the inks used have been adapted to the use of the plates of this character.

Present processes of color printing are consequently performed with inks which are of a very impure and often opaque color. The inks commonly used consist of a pigment or a dye to which various foreign materials have been added, such as varnish, dryer, and aluminum hydrate. These foreign materials are added to the coloring agent for the purpose of giving the ink sufficient body and "tack" to be carried by a roller and to be transferred from the roller to a plate in an even film.

The pure color without the addition of these foreign materials cannot be satisfactorily carried by such rollers, or transferred from such rollers to such plates, or from such plates to the paper.

It will be evident that the requirements of the material of which the plate is composed and material of which the roller is composed, governs the nature of the ink which must be used in the present processes and these requirements result in the production of a muddy or dead color in the finished print because of the addition of these deleterious substances to the ink.

In this art it has, therefore, always been a difficult matter to produce a clear, transparent and pure color on the sheet. The addition of the body giving materials, above mentioned, although performing a useful function in making it possible to carry the ink on the rollers and to transfer it to the plate, results in a print which suffers in the quality of its color. We have departed from the previous practice in the art in that we employ a coloring agent which is substantially pure and we avoid the necessity of adding to this coloring agent any deleterious foreign substances. The instrumentalities we use for carrying out our process are adapted to the nature of such coloring agents. For example, we utilize rollers and plates of materials that will carry our colors. It will thus be seen that our process is the reverse of that at present in use. In other words, we select materials for our rollers and plates which will carry our ink rather than selecting an ink which will be carried by the rollers and plates. Such a coloring agent comprises a pigment or dye in a hygroscopic carrier such as, for example, glycerine. The pigment or dye might be mixed with water or alcohol, were it not for the rapid drying qualities of these carriers which are likely to dry on the rollers or plates before the colors can be transferred to the paper. We prefer, therefore, to mix the pigment or dye with glycerine, or in a solution of glycerine and water which dries with moderate rapidity but stays moist long enough to allow the transfer from the rollers to the plate and from the plate to the paper. We have also found it of advantage to add as a binder a small quantity of rice paste to an ink made with pigment. Various light syrups may also be used, but in many instances such syrups, particularly if they contain sugar, give an undesirable gloss to the print. An ink of this or similar character we refer to hereinafter as a "watery ink" or as an ink of the "water color type." It will thus be seen that the ink or coloring agent used by us is an almost pure color when fed to the rollers and when the same has dried on the paper to which the impression has been transferred there is little trace of anything except pure color.

Such an ink may be made with a very heavy body or it may be made very fluid, according to the quantity of liquid carrier used in the mixture. In either case it may be used in our process and will yield a finished print having the desirable qualities hereinabove described. Such an ink will not, however, possess sufficient "tack" to function properly with plates and rollers ordinarily used.

We have found, however, that a roller composed of a resilient material such as rubber and a plate of the same or similar resilient material will hold the ink evenly and transfer the impression accurately to the paper. The plate, in fact, may consist of a wood block having a facing of heavy rubber sheet upon which the design may be cut either in relief or intaglio. The resiliency of the plate is an important element in our invention and the effect obtained by its use may be furthered by the use of a somewhat yielding material in the packing of the press upon which the sheet to be printed is held while the impression from the plate is being made. Sheet rubber may thus be used in the packing.

The instrumentalities used in our process, therefore, comprise an ink or coloring agent which is substantially pure; a roller of a material adapted to carry such an ink and transfer the same evenly to a plate; and a plate and packing of a resilient material. Separate plates are used for each color to be comprised in the print, as in the case in present processes.

Having thus described our invention what we claim is:

1. The process of color printing which comprises the inking of a relief plate of resilient material with an ink of the water color type and transferring an impression therefrom.

2. The process of color printing which comprises the inking of a relief plate of resilient material with an ink consisting of a coloring agent in a fluid adapted to carry said coloring agent without substantial modification of the color thereof and transferring an impression from said plate to paper.

3. The process of color printing which comprises the application of a film of an ink of the water color type to a printing form composed of resilient material and pressing said printing form against the sheet to be printed while the said sheet is resiliently held.

4. The process of color printing which comprises the application of a film of non-oleaginous coloring agent to a printing form of resilient material and pressing said plate against the sheet to be printed while the said sheet is resiliently held.

5. The process of color printing which comprises the application of a varnish free ink to a printing form of resilient material and pressing said printing form against the sheet to be printed while said sheet is resiliently held.

6. A process of color printing which comprises the making of an impression from a relief printing form composed of resilient material carrying a film of ink consisting of a coloring agent in a hygroscopic carrier.

7. A process of color printing which comprises the making of an impression from a relief printing form of resilient material with ink consisting of a coloring agent and glycerine without the addition of any other body giving material.

8. A process of color printing comprising the inking of a relief plate of resilient material with an ink consisting of a coloring agent in a highly fluid carrier.

9. The step in said process of color printing which consists in printing from a rubber plate with an ink of the water color type.

10. The process of color printing which comprises the inking with a liquid ink of a plate composed of resilient material suitably formed into the design to be printed, the edges of said resilient material forming the design being unconfined, and making an impression therefrom upon a resiliently held sheet.

In testimony whereof, we have hereunto set our hands this 28th day of December, 1925.

BERT C. CHAMBERS.
JOHN P. KNIERIM.
GEORGE S. MESSING.